US012712409B2

(12) United States Patent
Mogro Zambrano et al.

(10) Patent No.: US 12,712,409 B2
(45) Date of Patent: Aug. 18, 2026

(54) ELECTRIC DRIVE UNIT THAT INCLUDES A FLUID FLOW PATH

(71) Applicant: Schaeffler Technologies AG & Co. KG, Herzogenaurach (DE)

(72) Inventors: Antonio Eduardo Mogro Zambrano, Puebla (MX); Kyle Nelson, Wadsworth, OH (US); Christopher Chapanar, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 323 days.

(21) Appl. No.: 18/451,440

(22) Filed: Aug. 17, 2023

(65) Prior Publication Data

US 2025/0062655 A1 Feb. 20, 2025

(51) Int. Cl.
*H02K 5/20* (2006.01)
*H02K 9/19* (2006.01)

(52) U.S. Cl.
CPC ............... *H02K 5/203* (2021.01); *H02K 9/19* (2013.01)

(58) Field of Classification Search
CPC ............. H02K 5/203; H02K 9/19; H02K 1/32
See application file for complete search history.

(56) References Cited

U.S. PATENT DOCUMENTS

2004/0124722 A1* 7/2004 Uchida .................. B60L 50/16 903/952
2007/0188028 A1* 8/2007 Vasilescu ................ H02K 9/19 310/52
2014/0175920 A1* 6/2014 Cimatti ................. H02K 5/203 310/54
2017/0361697 A1* 12/2017 Haupt .................... H02K 7/083
2019/0157922 A1* 5/2019 Tangudu ................ H02K 1/146
2021/0218302 A1* 7/2021 Larson ..................... H02K 3/24
2022/0282781 A1* 9/2022 Nakata ..................... H02K 5/15
2023/0069613 A1* 3/2023 Osuga .................... H02K 7/083
2023/0261542 A1* 8/2023 Yamaguchi ......... F16H 57/0421 310/54
2023/0387755 A1* 11/2023 Nelson ..................... H02K 9/19
2024/0128829 A1* 4/2024 Tanaka .................. H02K 5/203
2024/0333055 A1* 10/2024 Yazaki ..................... H02K 9/19

OTHER PUBLICATIONS

Cordes, Laura, et al., "Experimental study of the pressure loss in aero-engine air-oil separators," The Aeronautical Journal, Aug. 2017, pp. 1-15, vol. 121, Special Issue 1242: The International Society of Air-breathing Engines (ISABE) 2017 Conference Special Issue, Royal Aeronautical Society, UK.

Ibarra, I., et al., "CFD simulations to improve the aerosol tangential inlet of a Differential Mobility Analyzer," Journal of Aerosol Science, May 2021, pp. 1-20, vol. 154, Issue 105740, Elsevier, Spain.

* cited by examiner

*Primary Examiner* — Oluseye Iwarere
*Assistant Examiner* — Masoud Vaziri
(74) *Attorney, Agent, or Firm* — Price Heneveld LLP

(57) ABSTRACT

An electric drive unit includes an electric motor and a housing that houses the electric motor. The housing includes a heat exchanging wall portion that includes an inner surface that defines a fluid jacket cavity for conveying a first fluid and an outer surface that is opposite the inner surface and that defines a fluid chamber for conveying a second fluid. The heat is transferred between the first and second fluids through the heat exchanging wall portion.

19 Claims, 6 Drawing Sheets

ELECTRIC DRIVE UNIT THAT INCLUDES A FLUID FLOW PATH

FIELD OF THE DISCLOSURE

The present disclosure generally relates to an electric drive unit. More specifically, the present disclosure relates to a fluid flow path that is defined at least partially by a housing of the electric drive unit.

BACKGROUND OF THE DISCLOSURE

Vehicles can include electric drive units. Electric drive units may include fluid flow paths that convey fluid throughout the electric drive units for cooling and lubrication. Improved fluid flow paths for electric drive units may be desired.

SUMMARY OF THE DISCLOSURE

According to a first aspect of the present disclosure, a drive unit for a vehicle includes an electric motor that includes a rotor shaft that defines a hollow that is accessible via an opening defined at an axial end of the rotor shaft, an output shaft that extends into the hollow through the opening, and a housing that houses the electric motor. The housing includes a collar having an interior surface that is substantially cylindrical and that extends circumferentially about the output shaft and a passage that extends substantially tangentially outward from the interior surface of the collar. The collar and the passage define a portion of a fluid flow path.

Embodiments of the first aspect of the disclosure can include any one or a combination of the following features:

the output shaft is configured to rotate about an axis that substantially corresponds with a radial center point of the substantially cylindrical interior surface of the collar;

the passage includes a first portion that includes a substantially cylindrical inner surface and a second portion that interrupts the substantially cylindrical interior surface of the collar;

the second portion of the passage includes an inner surface with a curvature that is substantially equal to the curvature of the substantially cylindrical inner surface of the first portion of the passage;

the second portion of the passage tapers to an endpoint that borders the substantially cylindrical interior surface of the collar of the housing, and the passage is substantially tangential with the interior surface of the collar at the endpoint of the second portion;

a baffle that extends circumferentially about an outer surface of the output shaft that is configured to redirect fluid flowing along the fluid flow path away from a portion of at least one of the rotor shaft and the output shaft, wherein the baffle is axially aligned with the substantially cylindrical interior surface of the collar of the housing;

the baffle includes an outer ring, an inner ring, and a connector ring that extends radially inboard and axially from the outer ring to the inner ring;

the outer ring is in an axially-spaced relationship with the substantially cylindrical interior surface of the collar, and the inner ring is in an axially-spaced relationship with the substantially cylindrical interior surface of the collar, such that the substantially cylindrical interior surface of the collar is disposed wholly, axially between the inner and outer rings of the baffle;

at least a portion of the inner ring is axially aligned with the opening at the axial end of the rotor shaft; and the rotor shaft includes an inner rotor shaft surface that defines the hollow, and a portion of the inner rotor shaft surface tapers radially outboard as the portion of the inner rotor shaft surface extends axially away from the substantially cylindrical interior surface of the collar of the housing.

According to a second aspect of the present disclosure, a housing of a drive unit for housing an electric motor includes a collar having an interior surface that is substantially cylindrical and that extends circumferentially about an output shaft of the drive unit, and a passage that extends substantially tangentially outward from the interior surface of the collar. The collar and the passage are configured to define a portion of a fluid flow path of the drive unit.

Embodiments of the second aspect of the disclosure can include any one or a combination of the following features:

the passage includes a first portion that includes a substantially cylindrical inner surface and a second portion that interrupts the substantially cylindrical interior surface of the collar;

the second portion of the passage includes an inner surface with a curvature that is substantially equal to the curvature of the substantially cylindrical inner surface of the first portion of the passage; and the second portion of the passage tapers to an endpoint that borders the substantially cylindrical interior surface of the collar of the housing, and the passage is substantially tangential with the interior surface of the collar at the endpoint of the second portion.

According to a third aspect of the present disclosure, a drive unit for a vehicle includes an electric motor that includes a rotor shaft that defines a hollow that is accessible via an opening defined at an axial end of the rotor shaft, an output shaft that extends into the hollow through the opening, and a housing that houses the electric motor and includes a collar having an interior surface that is substantially cylindrical and that extends circumferentially about the output shaft and a passage that extends substantially tangentially outward from the interior surface of the collar. The passage has a first portion that includes a substantially cylindrical inner surface and a second portion that interrupts the substantially cylindrical interior surface of the collar. The collar and the passage define a portion of a fluid flow path.

Embodiments of the third aspect of the disclosure can include any one or a combination of the following features:

the output shaft is configured to rotate about an axis that substantially corresponds with a radial center point of the substantially cylindrical interior surface of the collar;

the second portion of the passage includes an inner surface with a curvature that is substantially equal to the curvature of the substantially cylindrical inner surface of the first portion of the passage;

the second portion of the passage tapers to an endpoint that borders the substantially cylindrical interior surface of the collar of the housing, and the passage is substantially tangential with the interior surface of the collar at the endpoint of the second portion;

a baffle that extends circumferentially about an outer surface of the output shaft that is configured to redirect fluid flowing along the fluid flow path away from a portion of at least one of the rotor shaft and the output shaft, wherein the baffle is axially aligned with the substantially cylindrical interior surface of the collar of the housing; and the baffle includes an outer ring, an inner ring, and a connector ring that extends radially inboard and axially from the outer ring to the inner ring, and the outer ring is in an axially-spaced relationship with the substantially cylindrical interior surface of the collar, and the inner ring is in an axially-spaced relationship with the substantially cylindrical interior surface of the collar, such that the substantially cylindrical interior surface of the collar is disposed wholly, axially between the inner and outer rings of the baffle.

These and other features, advantages, and objects of the present disclosure will be further understood and appreciated by those skilled in the art by reference to the following specification, claims, and appended drawings.

Figure 1:
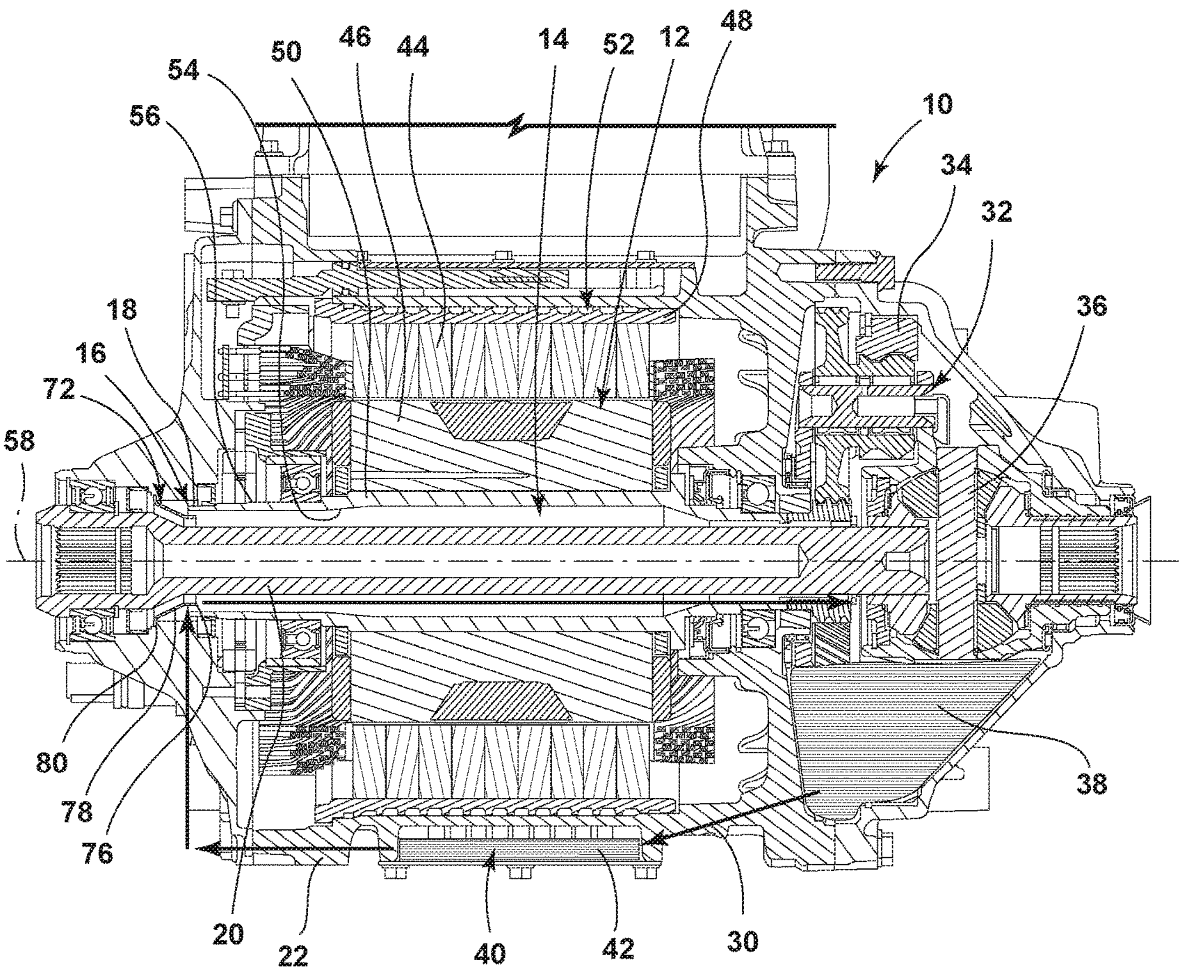
FIG. 1 is a cross-sectional view of an electric drive unit including a fluid flow path according to an embodiment of the present disclosure.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an" mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring now to FIGS. 1-6, a drive unit 10 for a vehicle includes an electric motor 12. The electric motor 12 includes a rotor shaft 50 that defines a hollow 14 that is accessible via an opening 16 defined at an axial end 18 of the rotor shaft 50. An output shaft 20 extends into the hollow 14 through the opening 16. A housing 22 houses the electric motor 12. The housing 22 includes a collar 24 that has an interior surface 26 that is substantially cylindrical and that extends circumferentially about the output shaft 20. The housing 22 further includes a passage 28 that extends substantially tangentially outward from the interior surface 26 of the collar 24. The collar 24 and the passage 28 define a portion of a fluid flow path 30.

Referring now to FIG. 1, an electric drive unit 10 for a vehicle is illustrated. The electric drive unit 10 may be designed as an electric axle ("the axle"), in various embodiments. The electric drive unit 10 includes a housing 22. The housing 22 can be functionally divided into a motor or center housing region and a gear or gearbox housing region. In some embodiments, the housing 22 may be designed as a die-cast aluminum housing 22 and may be formed in multiple parts. A gearbox 32 may include a planetary gearset 34, a differential 36, and a sump 38, for example. A heat exchanger 40 can be integrated with, or integral with, the center housing region. That is, the existing die casting process for the center housing region may be used to form the heat exchanger 40, in some implementations. A fluid chamber 42 of the heat exchanger 40 may be formed in an outer surface (for example, by casting) of the center housing region. In some embodiments, the heat exchanger 40 may be located on the bottom of the electric drive unit 10, as illustrated in FIG. 1. The heat exchanger 40 may be located in various locations, in various embodiments.

Referring still to FIG. 1, the electric drive unit 10 includes the electric motor 12. The electric motor 12 includes a stator 44, a rotor 46, a stator carrier 48, and the rotor shaft 50. The stator 44 also includes a fluid jacket 52 formed, and bounded, by the stator carrier 48 and a fluid chamber bottom wall of the fluid chamber 42. In this way, the stator carrier 48 forms an inner wall or a portion of the stator fluid jacket 52 and the fluid chamber bottom wall forms an outer wall or a portion of the stator fluid jacket 52. The cavity formed therebetween may be filled with a fluid, such as a water-glycol mixture, for example, for cooling the stator 44 and another fluid, such as oil, that is disposed within the fluid chamber 42 of the heat exchanger 40. In this arrangement, the heat exchanger 40 uses the existing cool walls of the stator fluid jacket 52 to cool fluid within the fluid chamber 42. That is, the fluid chamber bottom wall is in contact with the stator fluid jacket volume on an inner surface and is in contact with the fluid from the heat exchanger 40 on an outer surface and functions as a "cool wall." In various embodiments, the fluid chamber 42 of the heat exchanger 40 can be filled with oil, such that the fluid chamber 42 is an oil chamber. It is contemplated that a variety of types of fluids can be utilized within the cavity defined by the stator fluid jacket 52 and the fluid chamber 42. In operation of an exemplary embodiment of the electric drive unit 10, the gearbox 32 collects and distributes (via splashing from rotating components of the gearbox 32) oil from the gearbox sump 38 to the heat exchanger 40. The heat exchanger 40 cools the oil with the water that is disposed on the opposing side of the fluid chamber bottom wall within the stator fluid jacket 52. The cooled oil is then routed to the rotor shaft 50 along the fluid flow path 30 to provide active rotor 46 cooling. Fluid, such as oil, as described herein, may be routed along the fluid flow path 30 to the rotor shaft 50 via the passage 28 of the housing 22 and the collar 24 of the housing 22, as described further herein. In various implementations, rotation of the rotor shaft 50 via operation of the motor 12 may propel fluid along the fluid flow path 30 due to a tapered inner rotor shaft surface 54, as described further herein.

Figure 2:
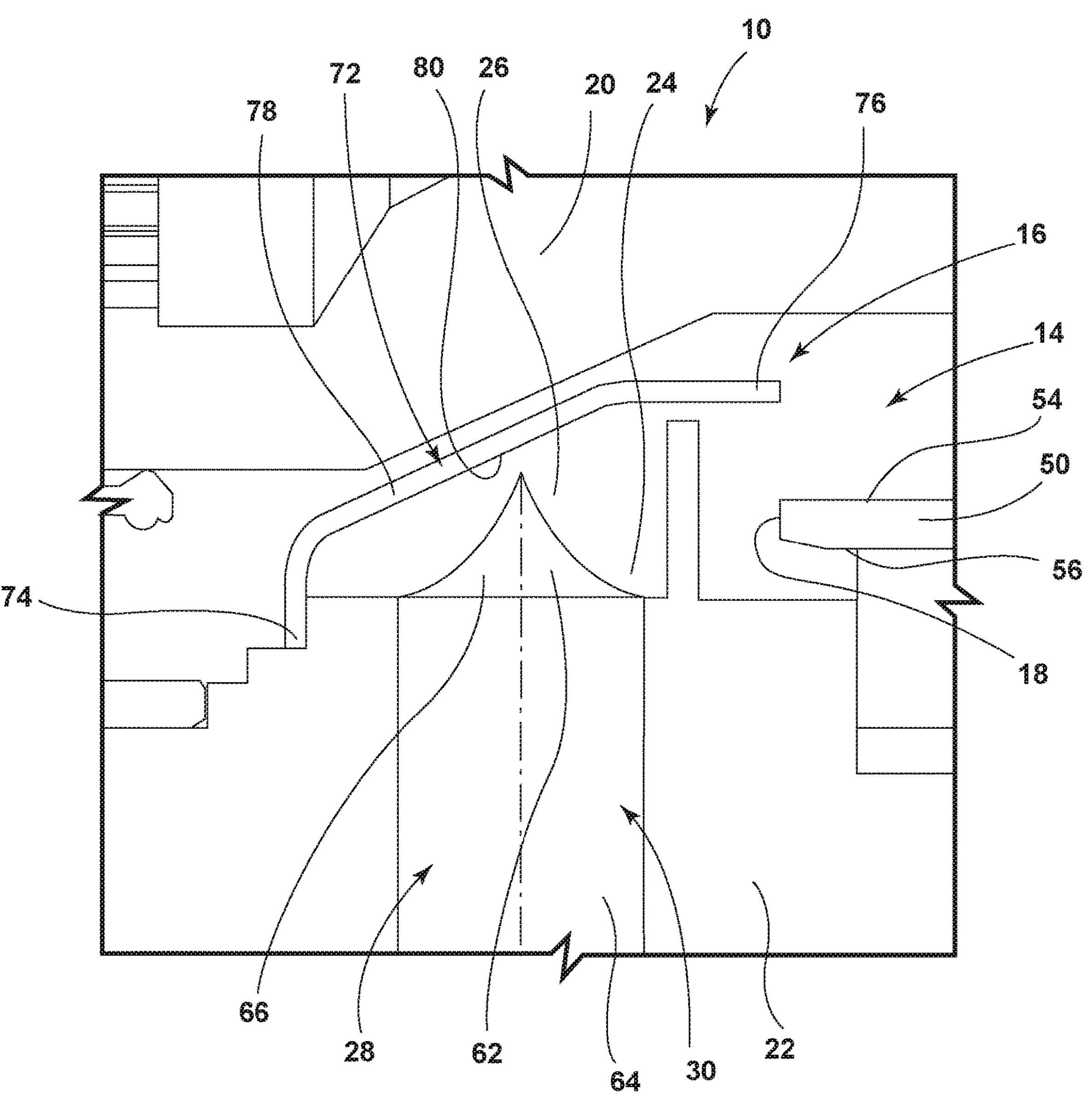
FIG. 2 is an enlarged cross-sectional view of a portion of the fluid flow path illustrating a passage of a housing of the electric drive unit.
Figure 3:
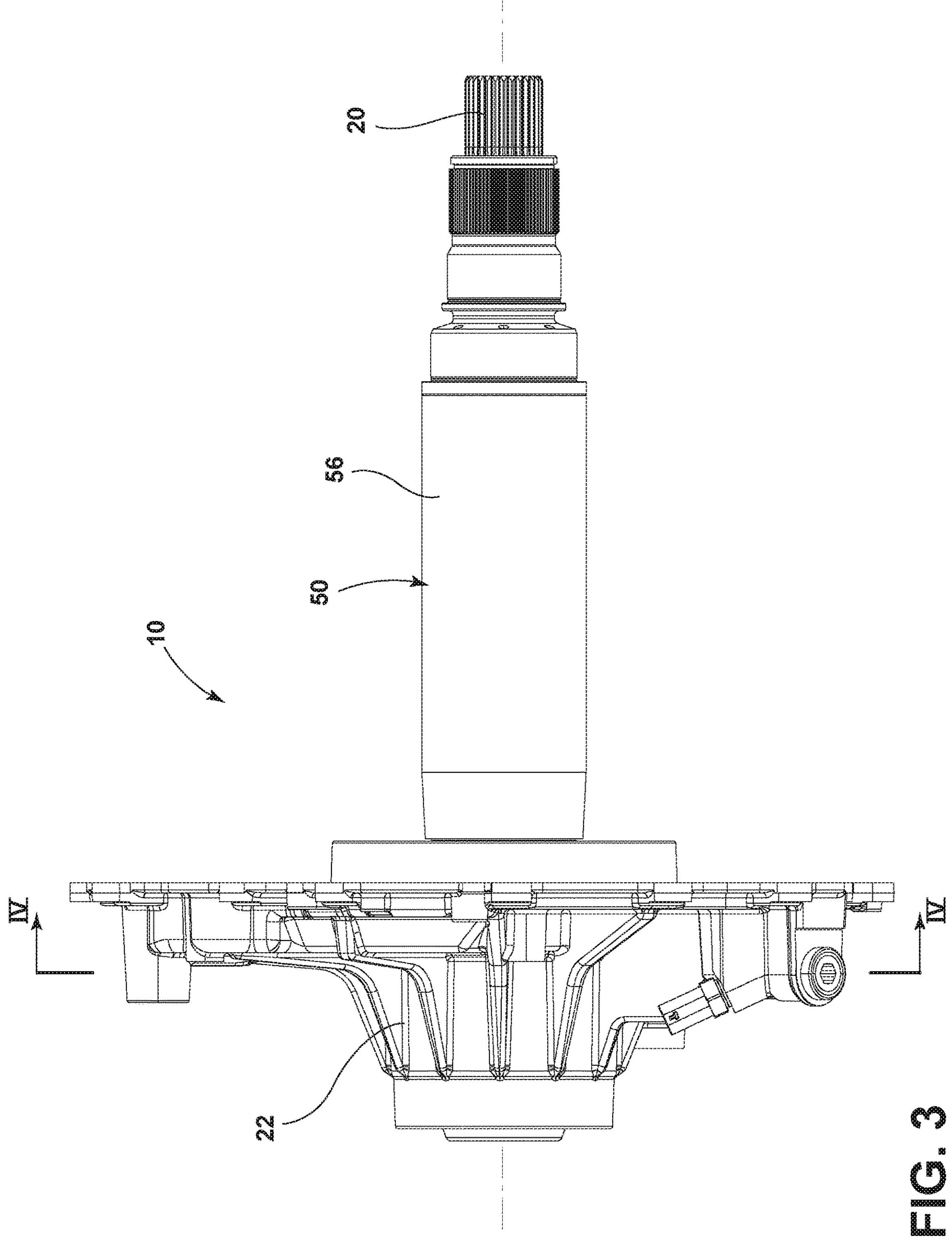
FIG. 3 is a front elevational view of a portion of an electric drive unit illustrating a portion of a housing of the electric drive unit, a rotor shaft, and an output shaft.

Referring now to FIGS. 1 and 2, the rotor shaft 50 of the electric motor 12 includes the inner rotor shaft surface 54 and an outer rotor shaft surface 56 opposite the inner rotor shaft surface 54. The inner rotor shaft surface 54 of the rotor shaft 50 defines a hollow 14. As illustrated in FIG. 1, at least a portion of the inner rotor shaft surface 54 tapers radially outboard as the inner rotor shaft surface 54 extends axially toward the gearbox 32 of the electric drive unit 10. In various embodiments, a portion of the inner rotor shaft surface 54 tapers radially outboard as the portion of the inner rotor shaft surface 54 extends axially away from the substantially cylindrical interior surface 26 of the collar 24 of the housing 22. This tapering of the inner rotor shaft surface 54 in combination with rotation of the rotor shaft 50 via the motor 12 may cause fluids to be propelled axially toward the gearbox 32 along the inner rotor shaft surface 54 of the rotor shaft 50, which, in some embodiments, may act as a pump to propel fluid throughout the fluid flow path 30 of the electric drive unit 10. As shown in FIG. 1, the rotor shaft 50 includes an opening 16 at an axial end 18 of the rotor shaft 50 that is axially distal from the gearbox 32. The opening 16 provides access to the hollow 14 defined by the inner rotor shaft surface 54.

Referring still to FIGS. 1 and 2, the output shaft 20 of the electric drive unit 10 extends through the opening 16 and into the hollow 14 defined by the inner rotor shaft surface 54 of the rotor shaft 50 to the gearbox 32, wherein the output shaft 20 is engaged with the differential 36 of the gearbox 32. Rotation of the rotor shaft 50 is configured to drive rotation of the output shaft 20.

Figure 4:
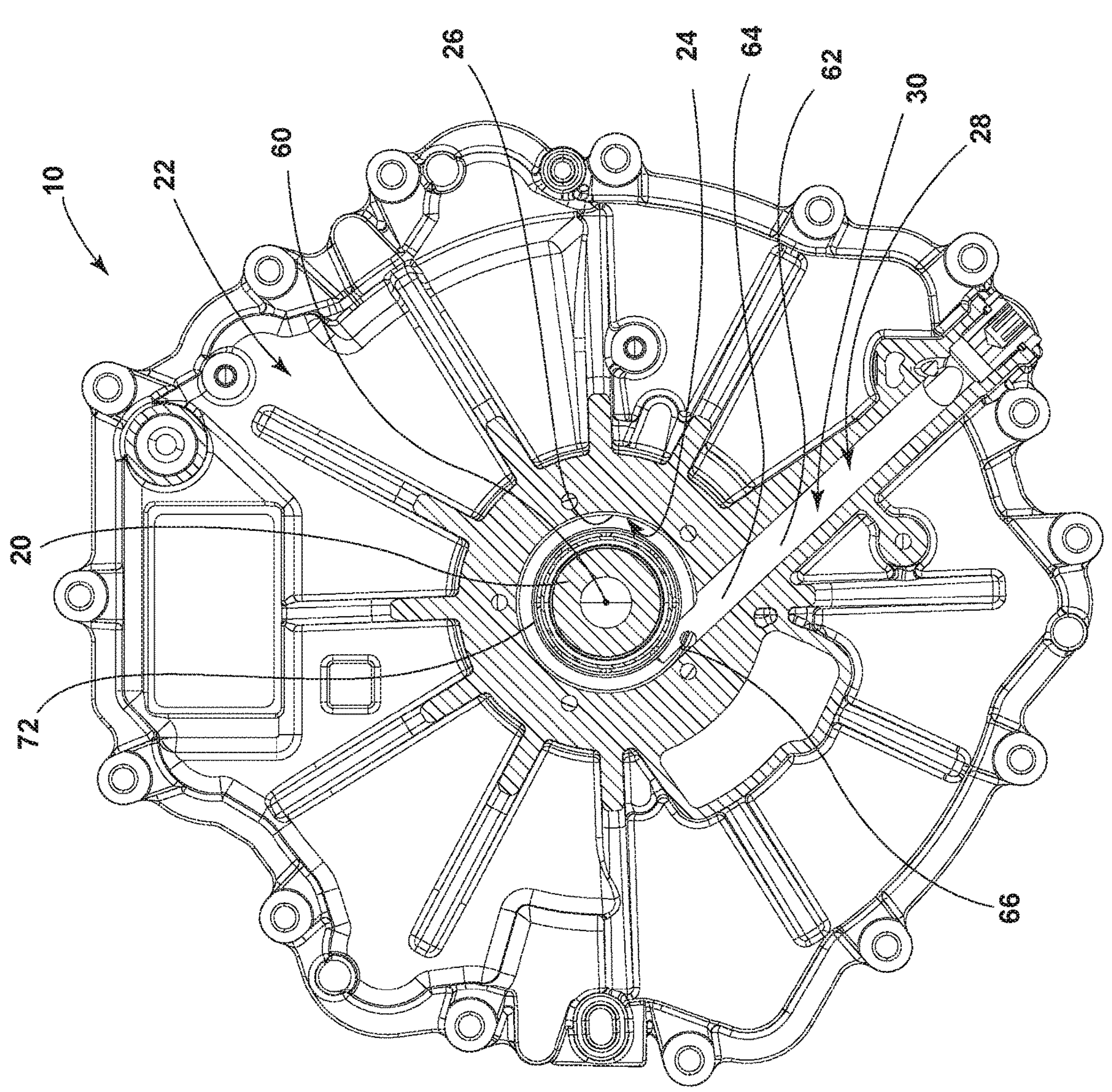
FIG. 4 is a cross-sectional view of the electric drive unit of FIG. 3 taken at line IV-IV illustrating a collar of the housing that includes an interior surface that is substantially cylindrical and a passage of the housing that extends substantially tangentially outward from the interior surface of the collar.
Figure 5:
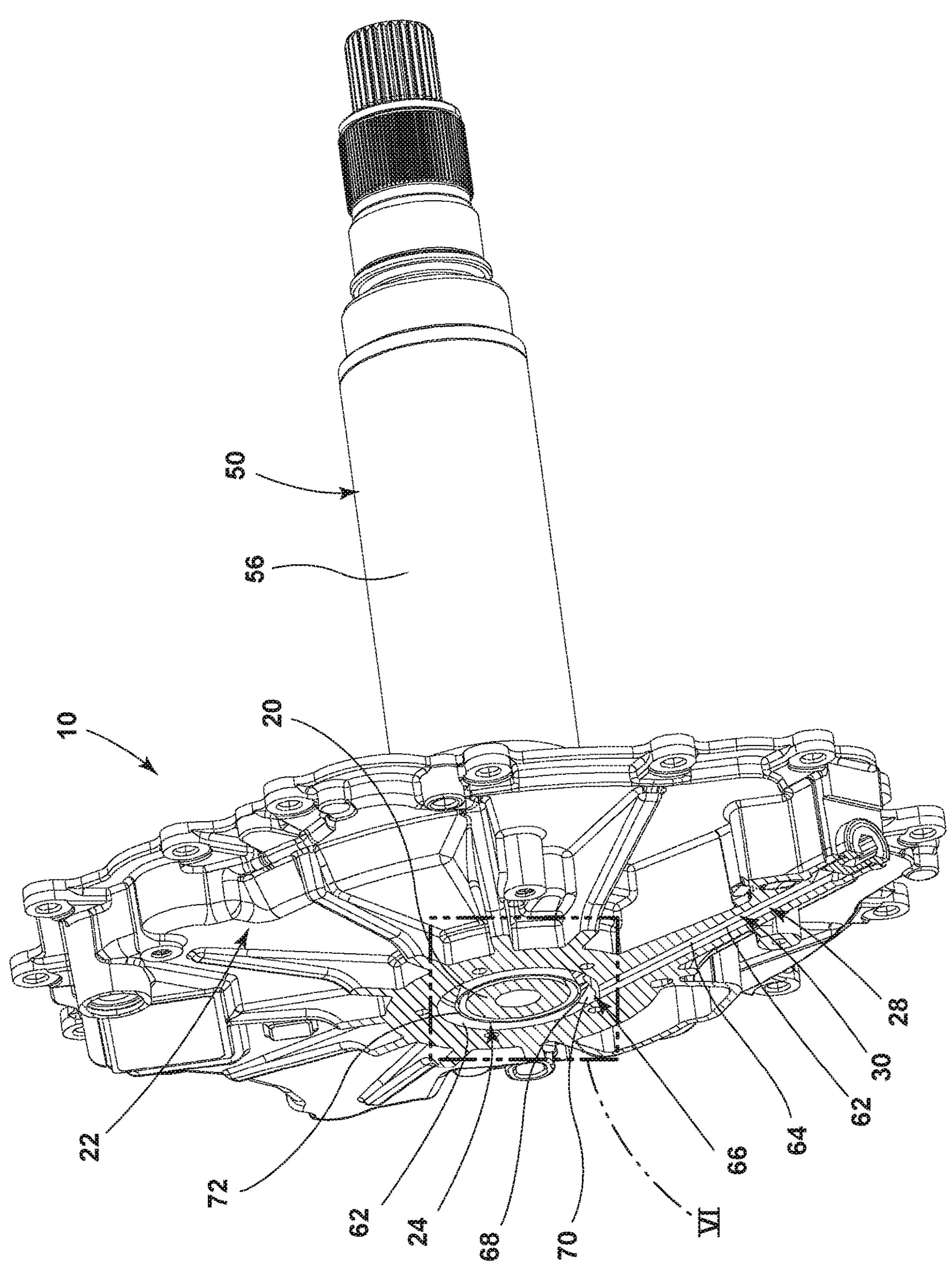
FIG. 5 is a top perspective view of the cross-sectional view of the electric drive unit shown in FIG. 4.
Figure 6:
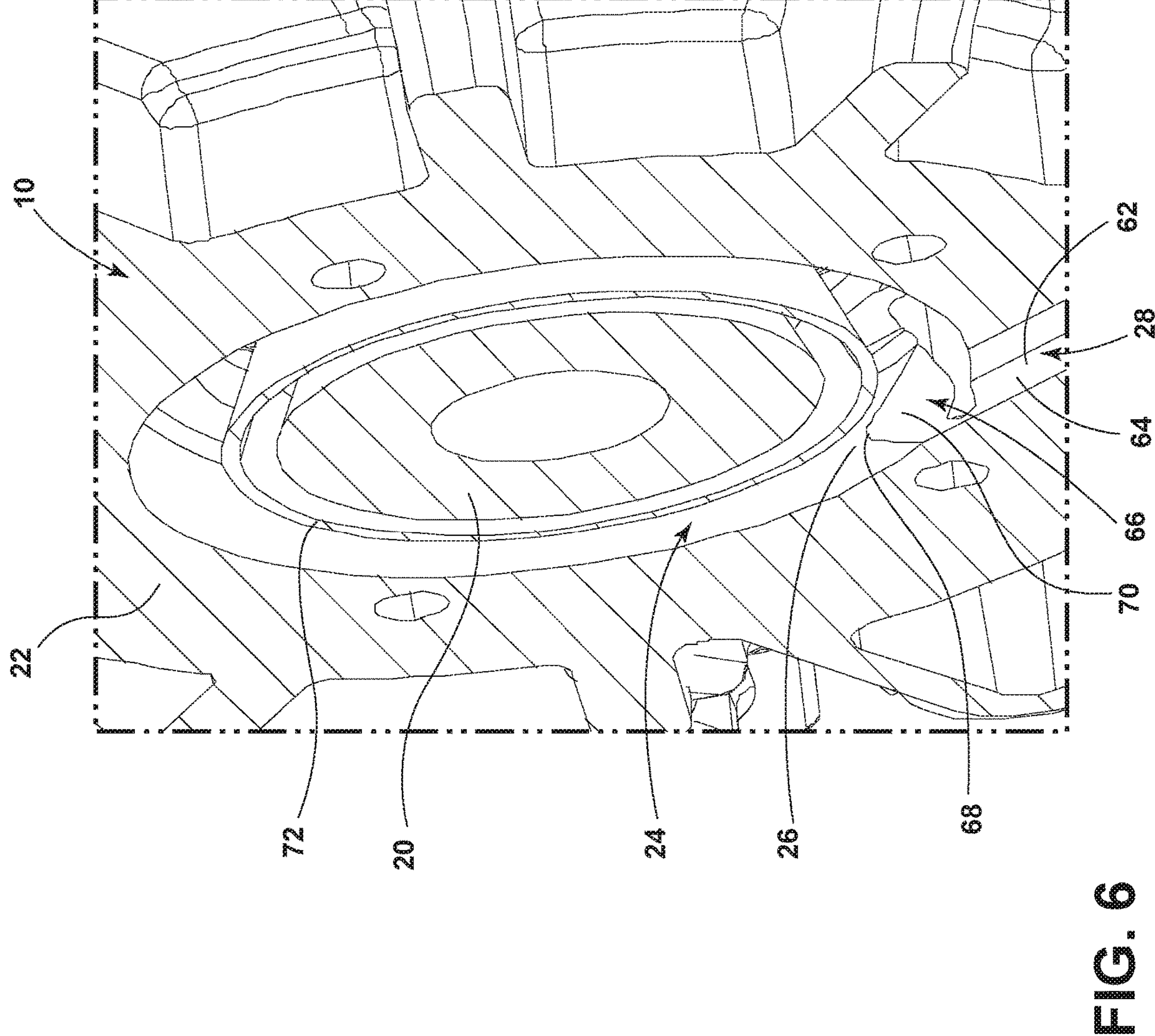
FIG. 6 is an enlarged view of area VI of FIG. 5 illustrating the interior surface of the collar of the housing and first and second portions of the passage of the housing.

Referring now to FIGS. 2-6, the housing 22 defines a portion of the fluid flow path 30. In various implementations, the housing 22 includes the collar 24. As illustrated in FIGS. 4-6, the collar 24 includes the interior surface 26. The interior surface 26 of the collar 24 is substantially cylindrical and extends circumferentially about the output shaft 20 of the electric drive unit 10. In various implementations, the interior surface 26 of the collar 24 extends circumferentially about a portion of the output shaft 20 that is outside of the hollow 14 defined by the rotor shaft 50. As described further herein, the substantially cylindrical interior surface 26 of the collar 24 defines a portion of the fluid flow path 30, and the substantially cylindrical nature of the interior surface 26 may allow fluid to flow continuously with minimal interruption along the fluid flow path 30. It is to be understood that the substantially cylindrical interior surface 26 of the collar 24 may not be entirely cylindrical, due to at least the interruption of the interior surface 26 by the passage 28 of the housing 22, as described further herein. In various implementations, the output shaft 20 is configured to rotate about an axis 58 that substantially corresponds with a radial center point 60 of the substantially cylindrical interior surface 26 of the collar 24.

Referring still to FIGS. 2-6, the housing 22 includes the passage 28. As illustrated in FIG. 4, the passage 28 of the housing 22 defines a portion of the fluid flow path 30 and extends substantially tangentially outward from the interior surface 26 of the collar 24 of the housing 22. In the embodiment illustrated in FIGS. 4-6, the passage 28 extends substantially tangentially outward from the collar 24 relative to a portion of the substantially cylindrical interior surface 26 of the collar 24 that borders a portion of the passage 28. As illustrated in FIGS. 2 and 6, the passage 28 may include a first portion 64 that includes a substantially cylindrical inner surface 62 and a second portion 66 that interrupts the substantially cylindrical interior surface 26 of the collar 24 of the housing 22. The second portion 66 of the passage 28 may include an inner surface 62 with a curvature that is substantially equal to the curvature of the substantially cylindrical inner surface 62 of the first portion 64 of the passage 28. As illustrated in FIG. 6, the second portion 66 of the passage 28 tapers to an endpoint 68. The endpoint 68 of the second portion 66 borders the substantially cylindrical interior surface 26 of the collar 24 of the housing 22. In various implementations, the passage 28 is substantially tangential with the substantially cylindrical interior surface 26 of the collar 24 at the endpoint 68 of the second portion 66 of the passage 28. As illustrated in FIG. 6, the second portion 66 defines a trough 70 that has the same curvature as the substantially cylindrical inner surface 62 of the first portion 64 of the passage 28, and the trough 70 tapers to the endpoint 68 that is substantially tangential with the substantially cylindrical interior surface 26 of the collar 24 that borders the endpoint 68 of the second portion 66.

Referring now to FIGS. 1-6, in operation of an exemplary embodiment of the electric drive unit 10, fluid is conveyed along the fluid flow path 30 during operation of the electric drive unit 10. Fluid exits the fluid chamber 42 and flows to the passage 28 of the housing 22. The fluid first enters the first portion 64 of the housing 22 then flows generally radially inboard toward the second portion 66 of the passage 28. The endpoint 68 of the second portion 66 is substantially tangentially aligned with the abutting portion of the substantially cylindrical interior surface 26 of the collar 24 of the housing 22. As such, the fluid flows from the passage 28 and onto the collar 24 in a manner that encourages the fluid to flow circumferentially along the interior surface 26 of the collar 24 before entering the opening 16 defined at the axial end of the rotor shaft 50. The fluid flowing along the passage 28 that is substantially tangential with the substantially cylindrical interior surface 26 may result in relatively efficient fluid flow compared with fluid that flows along a passage that is not tangentially aligned with the substantially cylindrical interior surface 26, wherein the flow of fluid may be slowed or reversed.

Referring now to FIGS. 1-6, the electric drive unit 10 may include a baffle 72. The baffle 72 may extend circumferentially about an outer surface of the output shaft 20, as illustrated in FIG. 1. The baffle 72 may be configured to redirect fluid flowing along the fluid flow path 30 away from a portion of at least one of the rotor shaft 50 and the output shaft 20. For example, in the embodiment illustrated in FIG. 1, the baffle 72 is configured to redirect fluid that would otherwise flow onto the rotating output shaft 20 into the hollow 14 defined by the inner rotor shaft surface 54 via the opening 16 at the axial end 18 of the rotor shaft 50. As illustrated in FIG. 2, the baffle 72 is axially aligned with a substantially cylindrical interior surface 26 of the collar 24 of the housing 22.

Referring now to FIGS. 1 and 2, the baffle 72 includes an outer ring 74, an inner ring 76, and a connector ring 78 that extends radially inboard and axially from the outer ring 74 to the inner ring 76. As illustrated in FIG. 2, the connector ring 78 includes an annular surface 80 that extends at a slope or angle radially inboard and axially from the outer ring 74 to the inner ring 76. The connector ring 78 extends radially inboard and axially toward the hollow 14 from the outer ring 74 to the inner ring 76. In various implementations, the surface of the baffle 72 that is aligned with the collar 24 of the housing 22 and/or the passage 28 of the housing 22 is angled relative to the flow direction of the fluid flowing from the passage 28 into the collar 24. As such, fluid that flows radially inboard of the collar 24 may be turned by the baffle 72 into the rotor shaft 50 about 90°. In various embodiments, the fluid can be gradually turned about 90°. The gradual turning of the fluid may advantageously reduce pressure drop compared to a system in which fluid flows directly to an outer surface of the output shaft 20 from the passage 28 of the housing 22. As illustrated in FIG. 2, in some implementations, the outer ring 74 of the baffle 72 is in an axially-spaced relationship with the substantially cylindrical interior surface 26 of the collar 24, and the inner ring 76 is in an axially-spaced relationship with the substantially cylindrical interior surface 26 of the collar 24, such that the substantially cylindrical interior surface 26 of the collar 24 is disposed wholly, axially between the inner and outer rings 76, 74 of the baffle 72. In some implementations, at least a portion of the inner ring 76 of the baffle 72 is axially aligned with the opening 16 at the axial end 18 of the rotor shaft 50, as illustrated in FIG. 2.

The electric drive unit 10 of the present disclosure may provide a variety of advantages. First, the housing 22 including the passage 28 that extends substantially tangentially outward from the substantially cylindrical interior surface 26 of the collar 24 of the housing 22 may increase the efficiency of fluid flow from the passage 28 to the collar 24. Second, the increased efficiency of fluid flow provided by the tangentially aligned passage 28 and collar 24 of the housing 22 may allow fluid to be propelled along the fluid flow path 30 via rotation of the rotor shaft 50 and without the use of an auxiliary fluid pump. Third, the tapered inner rotor shaft surface 54 may allow for fluid to be conveyed axially along the rotor shaft 50 as the rotor shaft 50 rotates. Fourth, the baffle 72 extending circumferentially about the output shaft 20 and being axially aligned with the collar 24 and the passage 28 of the housing 22 may encourage fluid to flow into the hollow 14 defined by the rotor shaft 50 rather than onto the outer surface of the output shaft 20, which may increase the efficiency of fluid flow within the fluid flow path 30.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 electric drive unit
12 electric motor
14 hollow
16 opening
18 axial end
20 output shaft
22 housing
24 collar
26 interior surface
28 passage
30 fluid flow path
32 gearbox
34 gearset
36 differential
38 sump
40 heat exchanger
42 fluid chamber
44 stator
46 rotor
48 stator carrier
50 rotor shaft
52 fluid jacket
54 inner rotor shaft surface
56 outer rotor shaft surface
58 axis
60 radial center point
62 inner surface
64 first portion
66 second portion
68 endpoint
70 trough
72 baffle
74 outer ring
76 inner ring
78 connector ring
80 annular surface

What is claimed is:

1. A drive unit for a vehicle, comprising:

an electric motor that includes a rotor shaft that defines a hollow that is accessible via an opening defined at an axial end of the rotor shaft;

an output shaft that extends into the hollow through the opening;

a housing that houses the electric motor and includes a collar having an interior surface that is substantially cylindrical and that extends circumferentially about the output shaft and a passage that extends substantially tangentially outward from the interior surface of the collar, wherein the collar and the passage define a portion of a fluid flow path; and a baffle that extends circumferentially about an outer surface of the output shaft that is configured to redirect fluid flowing along the fluid flow path away from a portion of at least one of the rotor shaft and the output shaft, wherein the baffle is axially aligned with the substantially cylindrical interior surface of the collar of the housing.

2. The drive unit of claim 1, wherein the output shaft is configured to rotate about an axis that substantially corresponds with a radial center point of the substantially cylindrical interior surface of the collar.

3. The drive unit of claim 1, wherein the passage includes a first portion that includes a substantially cylindrical inner surface and a second portion that interrupts the substantially cylindrical interior surface of the collar.

4. The drive unit of claim 3, wherein the second portion of the passage includes an inner surface with a curvature that is substantially equal to the curvature of the substantially cylindrical inner surface of the first portion of the passage.

5. The drive unit of claim 4, wherein the second portion of the passage tapers to an endpoint that borders the substantially cylindrical interior surface of the collar of the housing, and wherein the passage is substantially tangential with the interior surface of the collar at the endpoint of the second portion.

6. The drive unit of claim 1, wherein the baffle includes an outer ring, an inner ring, and a connector ring that extends radially inboard and axially from the outer ring to the inner ring.

7. The drive unit of claim 6, wherein the outer ring is in an axially-spaced relationship with the substantially cylindrical interior surface of the collar, and the inner ring is in an axially-spaced relationship with the substantially cylindrical interior surface of the collar, such that the substantially cylindrical interior surface of the collar is disposed wholly, axially between the inner and outer rings of the baffle.

8. The drive unit of claim 7, wherein at least a portion of the inner ring is axially aligned with the opening at the axial end of the rotor shaft.

9. A drive unit for a vehicle, comprising:

an electric motor that includes a rotor shaft that defines a hollow that is accessible via an opening defined at an axial end of the rotor shaft, wherein the rotor shaft includes an inner rotor shaft surface that defines the hollow;

an output shaft that extends into the hollow through the opening; and a housing that houses the electric motor and includes a collar having an interior surface that is substantially cylindrical and that extends circumferentially about the output shaft and a passage that extends substantially tangentially outward from the interior surface of the collar, wherein the collar and the passage define a portion of a fluid flow path, wherein a portion of the inner rotor shaft surface tapers radially outboard as the portion of the inner rotor shaft surface extends axially away from the substantially cylindrical interior surface of the collar of the housing.

10. A housing of a drive unit for housing an electric motor that includes an inner rotor shaft surface, the housing comprising:

a collar having an interior surface that is substantially cylindrical and that extends circumferentially about an output shaft of the drive unit, wherein the collar is configured such that a portion of the inner rotor shaft surface tapers radially outboard as the portion of the inner rotor shaft surface extends axially away from the substantially cylindrical interior surface of the collar; and a passage that extends substantially tangentially outward from the interior surface of the collar, wherein the collar and the passage are configured to define a portion of a fluid flow path of the drive unit.

11. The drive unit of claim 10, wherein the passage includes a first portion that includes a substantially cylindrical inner surface and a second portion that interrupts the substantially cylindrical interior surface of the collar.

12. The drive unit of claim 11, wherein the second portion of the passage includes an inner surface with a curvature that is substantially equal to the curvature of the substantially cylindrical inner surface of the first portion of the passage.

13. The drive unit of claim 12, wherein the second portion of the passage tapers to an endpoint that borders the substantially cylindrical interior surface of the collar of the housing, and wherein the passage is substantially tangential with the interior surface of the collar at the endpoint of the second portion.

14. A drive unit for a vehicle, comprising:

an electric motor that includes a rotor shaft that defines a hollow that is accessible via an opening defined at an axial end of the rotor shaft;

an output shaft that extends into the hollow through the opening;

a housing that houses the electric motor and includes a collar having an interior surface that is substantially cylindrical and that extends circumferentially about the output shaft and a passage that extends substantially tangentially outward from the interior surface of the collar, the passage having a first portion that includes a substantially cylindrical inner surface and a second portion that interrupts the substantially cylindrical interior surface of the collar, wherein the collar and the passage define a portion of a fluid flow path; and a baffle that extends circumferentially about an outer surface of the output shaft that is configured to redirect fluid flowing along the fluid flow path away from a portion of at least one of the rotor shaft and the output shaft, wherein the baffle is axially aligned with the substantially cylindrical interior surface of the collar of the housing.

15. The drive unit of claim 14, wherein the output shaft is configured to rotate about an axis that substantially corresponds with a radial center point of the substantially cylindrical interior surface of the collar.

16. The drive unit of claim 14, wherein the second portion of the passage includes an inner surface with a curvature that is substantially equal to the curvature of the substantially cylindrical inner surface of the first portion of the passage.

17. The drive unit of claim 16, wherein the second portion of the passage tapers to an endpoint that borders the substantially cylindrical interior surface of the collar of the housing, and wherein the passage is substantially tangential with the interior surface of the collar at the endpoint of the second portion.

18. The drive unit of claim 14, wherein the baffle includes an outer ring, an inner ring, and a connector ring that extends radially inboard and axially from the outer ring to the inner ring, and wherein the outer ring is in an axially-spaced relationship with the substantially cylindrical interior surface of the collar, and the inner ring is in an axially-spaced relationship with the substantially cylindrical interior surface of the collar, such that the substantially cylindrical interior surface of the collar is disposed wholly, axially between the inner and outer rings of the baffle.

19. The drive unit of claim 18, wherein at least a portion of the inner ring is axially aligned with the opening at the axial end of the rotor shaft.

* * * * *